(12) United States Patent
Cohen et al.

(10) Patent No.: US 7,484,073 B2
(45) Date of Patent: Jan. 27, 2009

(54) TAGGED TRANSLATION LOOKASIDE BUFFERS IN A HYPERVISOR COMPUTING ENVIRONMENT

(75) Inventors: Ernest S. Cohen, Wyncote, PA (US); Matthew D. Hendel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 219 days.

(21) Appl. No.: 11/484,949

(22) Filed: Jul. 12, 2006

(65) Prior Publication Data

US 2008/0016315 A1     Jan. 17, 2008

(51) Int. Cl.
*G06F 13/00* (2006.01)
(52) U.S. Cl. .................. 711/207; 711/205; 711/209
(58) Field of Classification Search .......... 711/205, 711/207, 209
See application file for complete search history.

(56) References Cited

U.S. PATENT DOCUMENTS 6,795,966 B1 * 9/2004 Lim et al. .................. 718/1
7,299,337 B2 * 11/2007 Traut et al. ................ 711/206
2007/0294505 A1 * 12/2007 Traut et al. ................ 711/207

OTHER PUBLICATIONS

Black, D.L. et al., "Translation Lookaside Buffer Consistency: A Software Approach", *Proceedings of the Third International Conference on Architectural Support for Programming Languages and Operating Systems*, Apr. 1989, 113-122.
Chang, M.S. et al., "Lazy TLB Consistency for Large-Scale Multiprocessors", 2nd *AIZU International Symposium on Parallel Algorithms/Architecture Synthesis*, Mar. 1997, 308-315.
Teller. P.J., "Translation-Lookaside Buffer Consistency", *IEEE Computer*, Jun. 1990, 308-315.

* cited by examiner

*Primary Examiner*—Reba I Elmore
(74) *Attorney, Agent, or Firm*—Woodcock Washburn LLP

(57) ABSTRACT

Tagged translation lookaside buffer consistency is enabled in the presence of a hypervisor of a virtual machine computing environment, in which multiple processes of multiple logical processors of guests are hosted by a virtual machine monitor or hypervisor component. The virtual machine monitor or hypervisor component maintains tagged TLB data associated with the plurality of processes on behalf of each of the plurality of logical processors, thereby ensuring consistency of the tagged TLB data across all of the plurality of processes.

20 Claims, 10 Drawing Sheets

| TLB | |
|---|---|
| VA1 | PA1 |
| VA2 | PA2 |
| VA3 | PA3 |
| VA4 | PA4 |
| VA5 | PA5 |
| VA6 | PA6 |
| ⋮ | ⋮ |

Addition of Process Identifier Tag Column

| Tagged TLB | | |
|---|---|---|
| 1 | VA1 | PA1 |
| 1 | VA2 | PA2 |
| 1 | VA3 | PA3 |
| 2 | VA4 | PA4 |
| ⋮ | ⋮ | ⋮ |

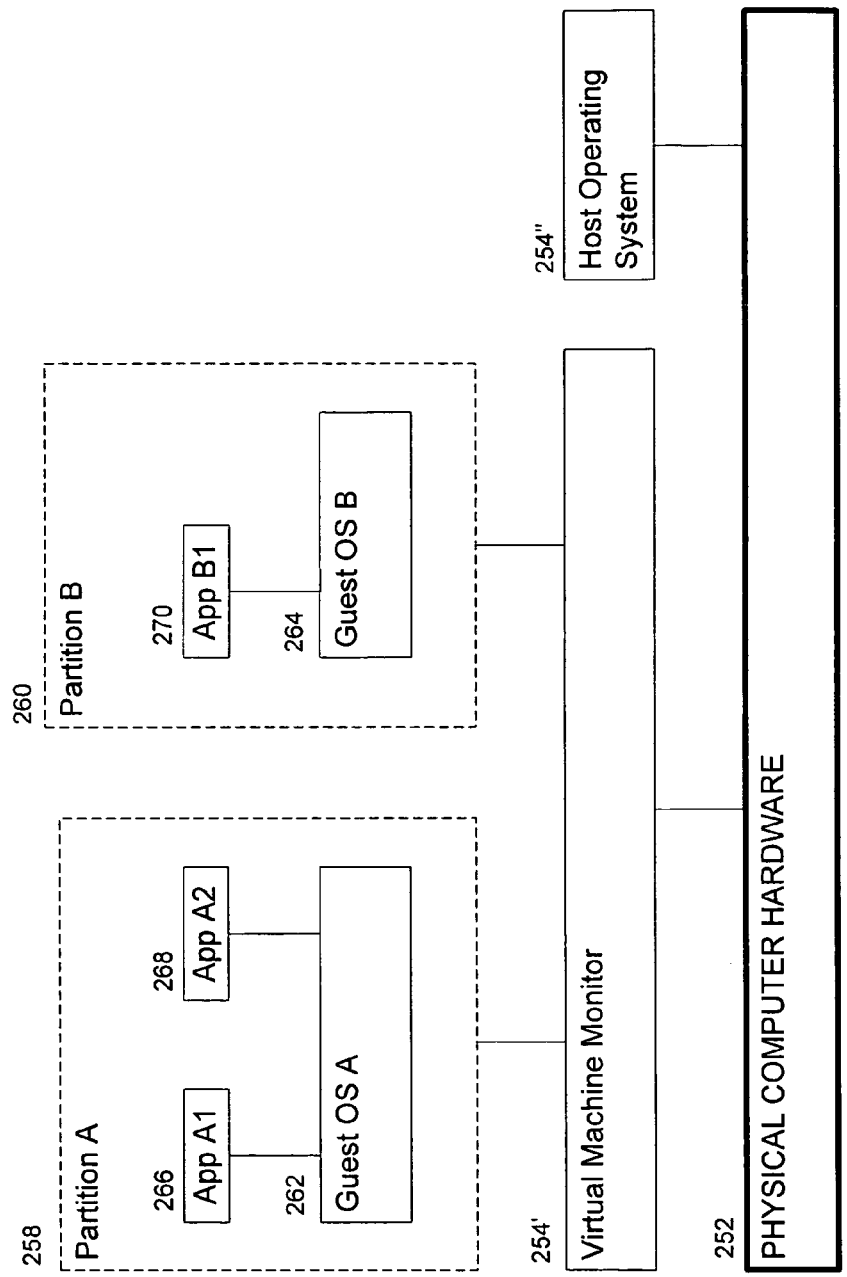

| | ASID | Virtual Address | Physical Address | Flags |
|---|---|---|---|---|
| | 100 | 8000:0000 | 100000 | R |
| | 100 | 8000:1000 | 101000 | R, W |
| | 100 | 8000:2000 | 102000 | |
| | 101 | 8000:0000 | 103000 | R, W, A, D |
| N Entries (e.g. 128 entries) | ⋮ | ⋮ | ⋮ | ⋮ |
| | 101 | 8000:1000 | 104000 | R, A |
| | 101 | C000:B000 | 105000 | R, A |
| | 102 | 8000:0000 | 106000 | R, A |
| | 102 | 8000:D000 | 107000 | R |

TAGGED TRANSLATION LOOKASIDE BUFFERS IN A HYPERVISOR COMPUTING ENVIRONMENT

BACKGROUND

Overall performance of a computer system heavily depends on the efficiency of the memory hierarchy. The memory system performance is dependent not only on data caches, but also on address caches. The importance of the memory system performance is increasing as the processor cycle times decrease.

A translation lookaside buffer (TLB) is a cache that is used to speed up address translation in a paged virtual memory system. The cache is implemented on-chip to reduce memory access delay. Without a TLB, every instruction or data reference would require additional memory accesses to the page table. The TLB access time becomes more crucial for physically indexed caches, because it is on the critical path of cache accesses.

A TLB is a virtual cache which retrieves a physical address indexed by a virtual address. The paging information is stored in a page table entry (PTE) resident in main memory, and its copy is cached into a TLB entry. Inconsistency between a PTE and TLB entry might occur in uniprocessors when an application invokes a virtual memory operation updating a PTE, e.g., a virtual memory operation issued by a user application for memory allocation, deallocation, attribute modification, etc. A uniprocessor maintains consistency by invalidating or flushing the TLB after updating a PTE, since the uniprocessor knows when inconsistency occurs and only a local TLB is involved.

In a shared memory multiprocessor (SMP) environment, multiple threads can be associated with a single parallel application. These threads run independently on different processors, but they all have to share the same address space. Since these threads share the common page table, the same page table entry can be cached into multiple TLBs. If any of the threads updates such a replicated TRE, it causes an inconsistent state among those TLBs. The problem caused by such inconsistent state is referred to as the TLB consistency problem.

There are a number of existing algorithms in the prior art that are directed to solving the TLB consistency problem in uniprocessor and multiprocessor environments; however, no such algorithms are directed to solving the TLB consistency problem in the face of a virtual machine computing environment having a hypervisor, or a computing environment managed by a virtual machine manager (VMM). Also, some prior art approaches include performing spinlocks for flushing the TLB. However, since the purpose of a tagged TLB is to improve performance, a tagged TLB algorithm is also desired that avoids expensive spinlocks for flushing the TLB. As described below in the various following sections, the invention addresses these and other needs in the art.

SUMMARY OF THE INVENTION

Tagged translation lookaside buffer consistency is provided in the presence of a hypervisor of a virtual machine computing environment. In various non-limiting embodiments, an algorithm for maintaining TLB consistency is provided in a hypervisor environment wherein the tagged TLB algorithm(s) are performed and managed by the hypervisor on behalf of one or more guests. Also, the algorithms of the invention rely upon two atomic instructions, i.e., interlocked-or and interlocked-and, which avoid the expense of spinlocks in prior art algorithms. In accordance with the invention, the virtual machine monitor or hypervisor component maintains tagged TLB data associated with the plurality of processes on behalf of each of the plurality of logical processors, thereby ensuring consistency of the tagged TLB data across all of the plurality of processes.

Other features of the present invention are described below.

BRIEF DESCRIPTION OF THE DRAWINGS

The techniques for providing tagged TLB consistency in the presence of a hypervisor are further described with reference to the accompanying drawings in which:

FIG. 3B is a block diagram representing an alternative virtualized computing system wherein the virtualization is performed by a virtual machine monitor running side-by-side with a host operating system;

DETAILED DESCRIPTION OF ILLUSTRATIVE EMBODIMENTS

Overview

Figure 1A:
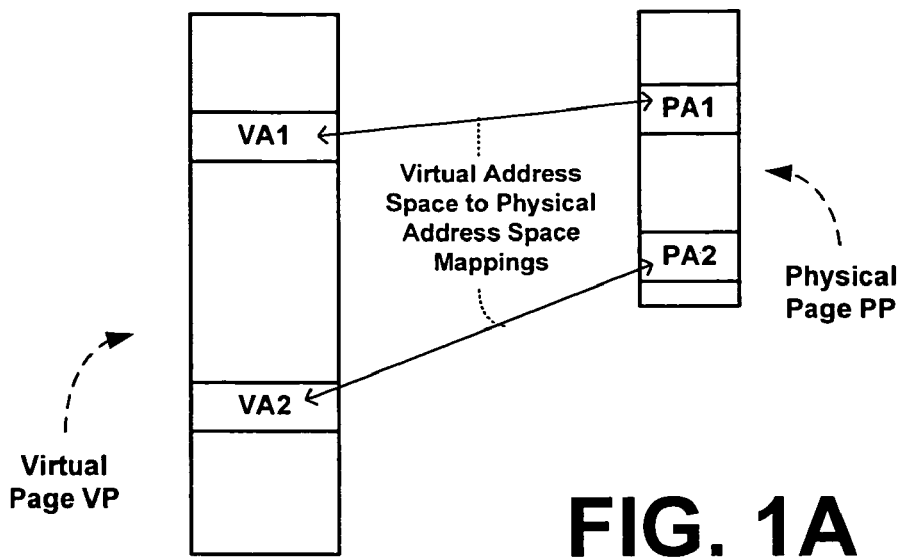
FIGS. 1A, 1B, 1C, 1D and 1E illustrate exemplary supplemental context regarding translation lookaside buffering techniques.

As described in the background, various tagged TLB architectures exist to improve the performance of TLBs over untagged architectures. However, none of the existing tagged TLB architectures have been implemented with the additional operational layer and security challenges presented by a hypervisor environment, for instance, when operating in connection with one or more guest operating systems. In consideration of such issues, as described in the various non-limiting embodiments below, the invention provides algorithms for ensuring consistency of tagged TLBs in a hypervisor environment, wherein the tagged TLB algorithm(s), historically performed and managed locally by guest operating systems, are performed and managed by the hypervisor on behalf of the guest operating systems.

Also, as mentioned, the purpose of a tagged TLB is to improve performance. Thus, ideally, tagged TLB algorithms should be selected in a way that avoids expensive spinlocks for flushing the TLB. Accordingly, instead of spinlocks, in various non-limiting embodiments, the algorithms of the invention rely upon two atomic instructions, specifically interlocked-or and interlocked-and, which avoid the expense of spinlocks in prior art algorithms.

The TLB consistency algorithm of the invention is optimized to minimize the number of required shared variable accesses, i.e., shared between multiple logical processors. Furthermore, the TLB consistency algorithm of the invention takes advantage of the split between the hypervisor and the guest operating systems to further improve performance. Specifically, traditional tagged TLB algorithms operate within the context of one of the address spaces, e.g., address space identifiers (ASIDs), available while operating. However, with the invention, since the hypervisor is in a completely separate address space from any of the address spaces of the guest operating systems, the hypervisor can advantageously delay certain operations, potentially improving performance. Moreover, with the invention, tagged TLB algorithms are implemented by the hypervisor for a guest operating system that does not understand the tagged TLB process. Also, the algorithms of the invention rely upon two atomic instructions, i.e., interlocked-or and interlocked-and, which avoid the expense of spinlocks in prior art algorithms.

In this regard, the TLB consistency algorithms in accordance with the invention achieve these and other advantages and improvements over the state of the art, as described in more detail below. First, additional context is set forth for Tagged TLBs and exemplary Virtual Machine (VM) environments to help understand the associated concepts and terminology used herein. Then, some exemplary non-limiting embodiments and implementations of the invention are described. Lastly, some exemplary computing and network environments in which computing devices of all kinds can be found are described as appropriate operating environments for aspects of the invention, since any computing system may include virtual machine technology.

Supplemental Context relating to TLBs and Tagged TLBs

Figure 1B:
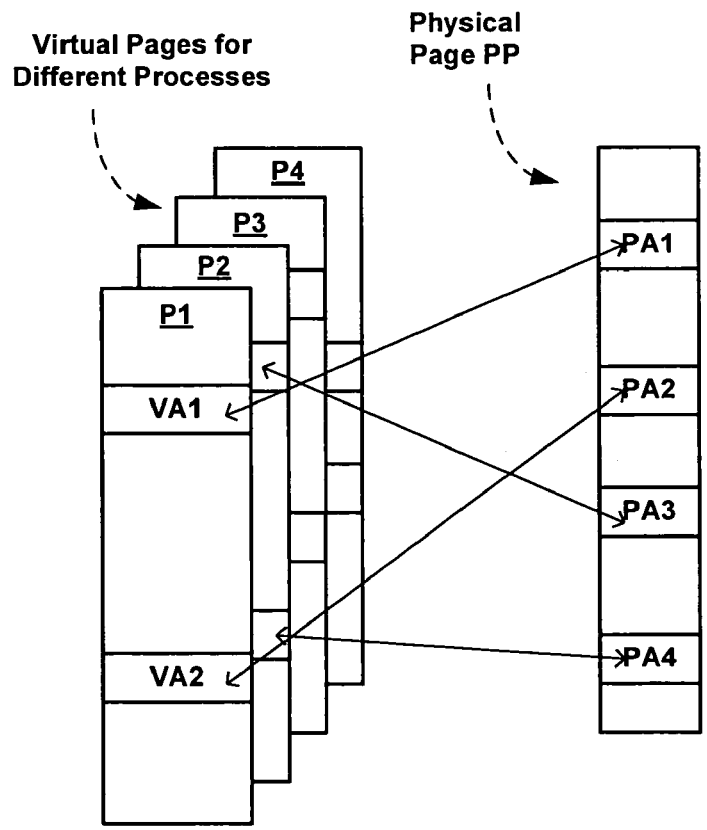

TLBs are used to make the processing of mapping virtual memory space to physical memory space more efficient. As shown in FIG. 1A, in paged memory architectures, virtual memory space (i.e., an abstract memory space that is not concerned with the underlying addressing scheme utilized by the associated storage device) is organized into structures known as virtual pages VP and physical memory space (i.e., the address space used by the associated physical storage device) is organized into structures known as physical pages PP. At a high level, a processor will use virtual addresses VA1, VA2, etc. in operation, which will then be mapped to physical addresses PA1, PA2, etc. of the physical address space. FIG. 1B shows that different processes P1, P2, P3, P4 have different virtual address spaces and corresponding mappings of virtual addresses VA1, VA2, etc. to physical addresses PA1, PA2, PA3, PA4, etc. of physical memory. A page table typically handles page mappings from virtual pages to physical pages, however, because typically some sort of a page walk must be performed by the processor to determine the exact mapping to physical address space, this can be an expensive operation from a computation standpoint, particularly when the number of processes independently operating begins to increase along with concomitant increase of memory pages and storage requirements.

Figures 1C, 1D, 1E:
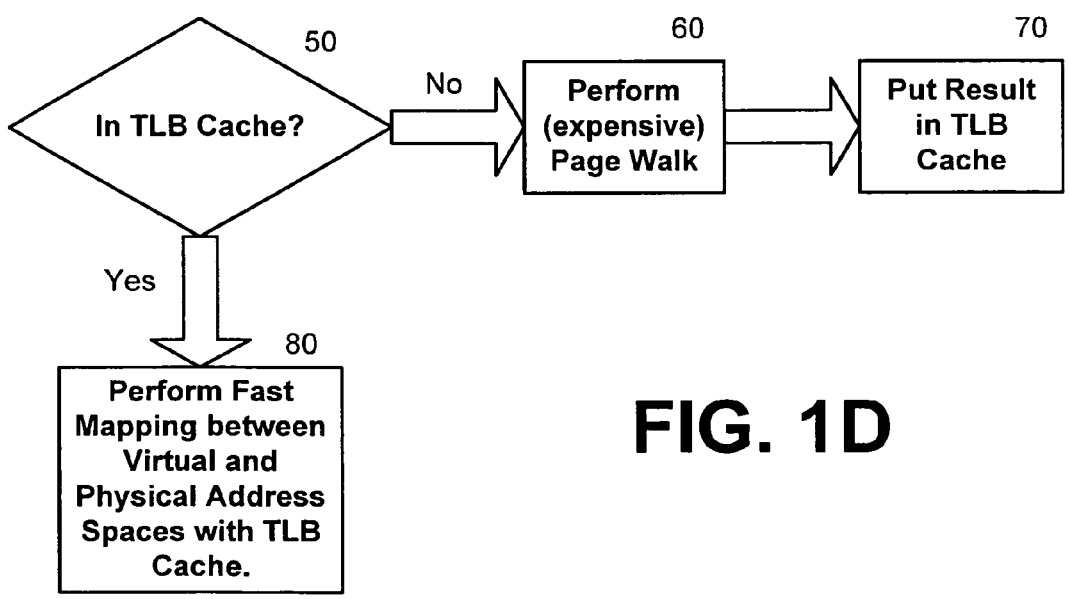

In consideration of such expensive page walks, FIG. 1C illustrates that the basic idea of a translation lookaside buffer TLB, which is typically a hardware cache interacted with by the processor to avoid redundant, expensive page mappings. TLBs enable enormous performance savings because once a mapping is completed, the work can be cached in the TLB so that the work need not be done expensively again. For instance, the TLB of FIG. 1C shows virtual address VA1 mapped to physical address PA1, virtual address VA2 mapped to physical address PA2, virtual address VA3 mapped to physical address PA3, virtual address VA4 mapped to physical address PA4, virtual address VA5 mapped to physical address PA5, virtual address VA6 mapped to physical address PA6, and so on. FIG. 1D in turn shows a high level flow diagram of the implementation of a TLB in a hardware cache. At 50, a determination is made whether the mapping can be done with reference to the mappings contained by the TLB. If not, then the expensive form of mapping is performed at 60, the result of which is placed in the TLB cache at 70 for next time. If the mapping is in the TLB cache, the mapping becomes instantly available to translate to physical memory space at 80.

However, a problem arises from the separateness of processors and processes all interacting with the same underlying physical memory space, i.e., when a switch between processes and virtual memory spaces occurs, information maintained in multiple TLBs maintained for multiple processes and processors can become inconsistent, and not up to date. Thus, to rectify this problem, the notion of tagged TLBs was introduced as shown by the exemplary Tagged TLB of FIG. 1E. As illustrated, by placing a tag column that identifies the process (unique tag per process) with which the mapping is associated, the processors can maintain consistency of the information represented by the TLBs by disambiguating different mappings from different processes.

Supplemental Context Relating to Virtual Machines

In a typical virtual machine environment, multiple virtual machines or "partitions" run on top of virtualizing software. This software, in turn, runs on top of hardware. The virtualizing software exposes the hardware in such a fashion that allows for a plurality of partitions, each with its own operating system (OS), to run on the hardware. The hardware is thus virtualized for the partitions by the virtualizing software.

Individual partitions are able to run disparate OSes, such as Windows, Linux, Solaris, MacOS and so on. These OSes can be isolated from each other such that if one OS in a partition crashes it will not affect other OSes in other partitions. Additionally, allowing multiple OSes to run on a single piece of hardware but in different partitions makes it easy to run different versions of software developed for different versions or types of OSes.

The terms hypervisor and virtual machine manager (VMM) are used herein interchangeably, whether utilized in conjunction with or part of a host operating system or not; and the terms virtual machine and partition are also used interchangeably, i.e., where the term partition is used, this should be considered the same as the term virtual machine.

Figure 2:
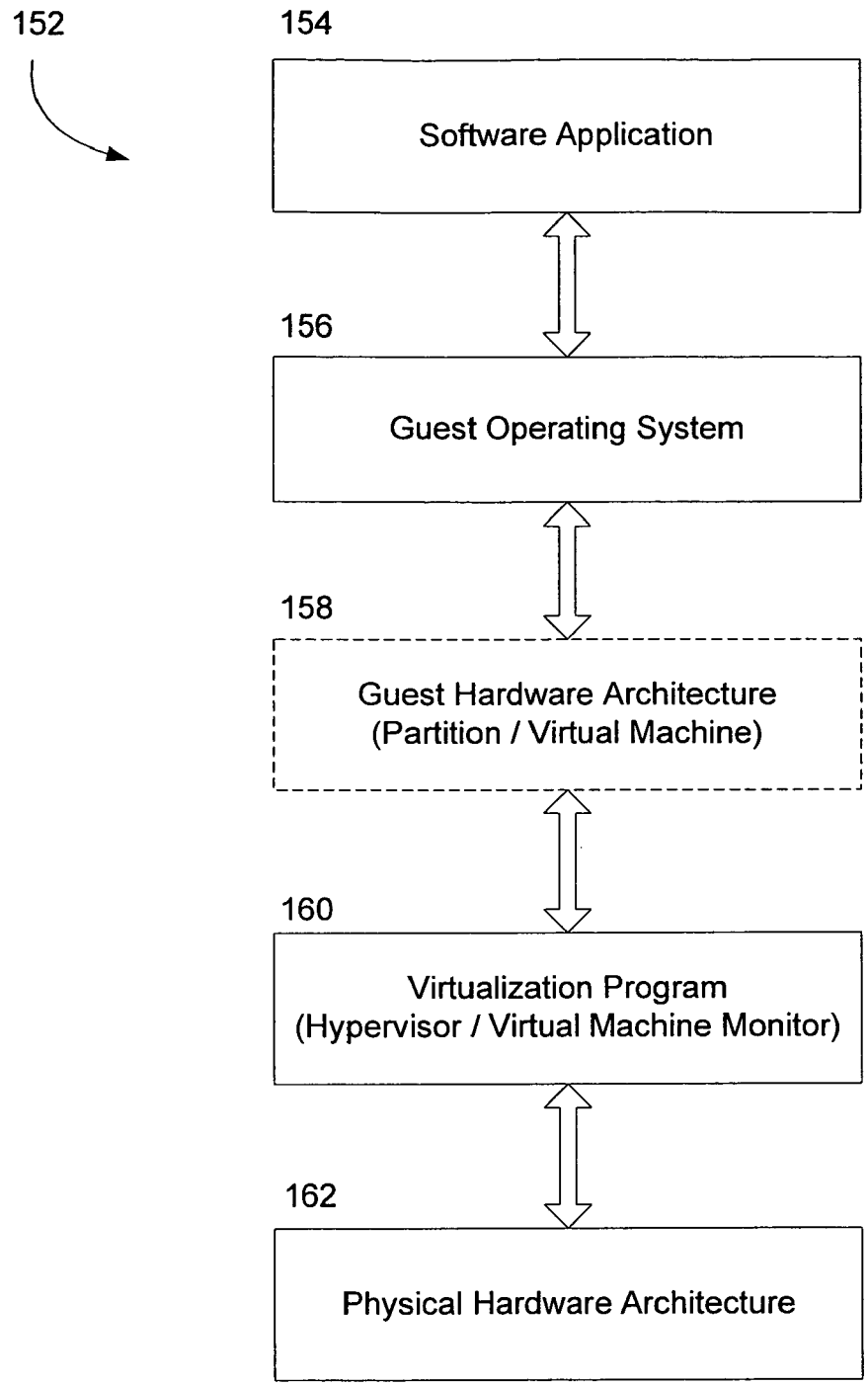
FIG. 2 is a block diagram representing the logical layering of the hardware and software architecture for virtualized operating environment in a computer system.

FIG. 2 is a diagram representing the logical layering of the hardware and software architecture for a virtualized environment in a computer system. In the figure, a virtualization program 160 runs directly or indirectly on the physical hardware architecture 162. The virtualization program 160 may be (a) a virtual machine monitor that runs alongside a host operating system or (b) a host operating system with a hypervisor component wherein the hypervisor component performs the virtualization. The virtualization program 160 virtualizes a guest hardware architecture 158 (shown as dashed lines to illustrate the fact that this component is a partition or a "virtual machine"), that is, hardware that does not actually exist but is instead virtualized by the virtualizing program 160. A guest operating system 156 executes on the guest hardware architecture 158, and a software application 154 runs on the guest operating system 156. In the virtualized operating environment of FIG. 2, the software application 154 can run in a computer system 152 even if the software application 154 is designed to run on an operating system that is generally incompatible with a host operating system and the hardware architecture 162.

Figure 3A:
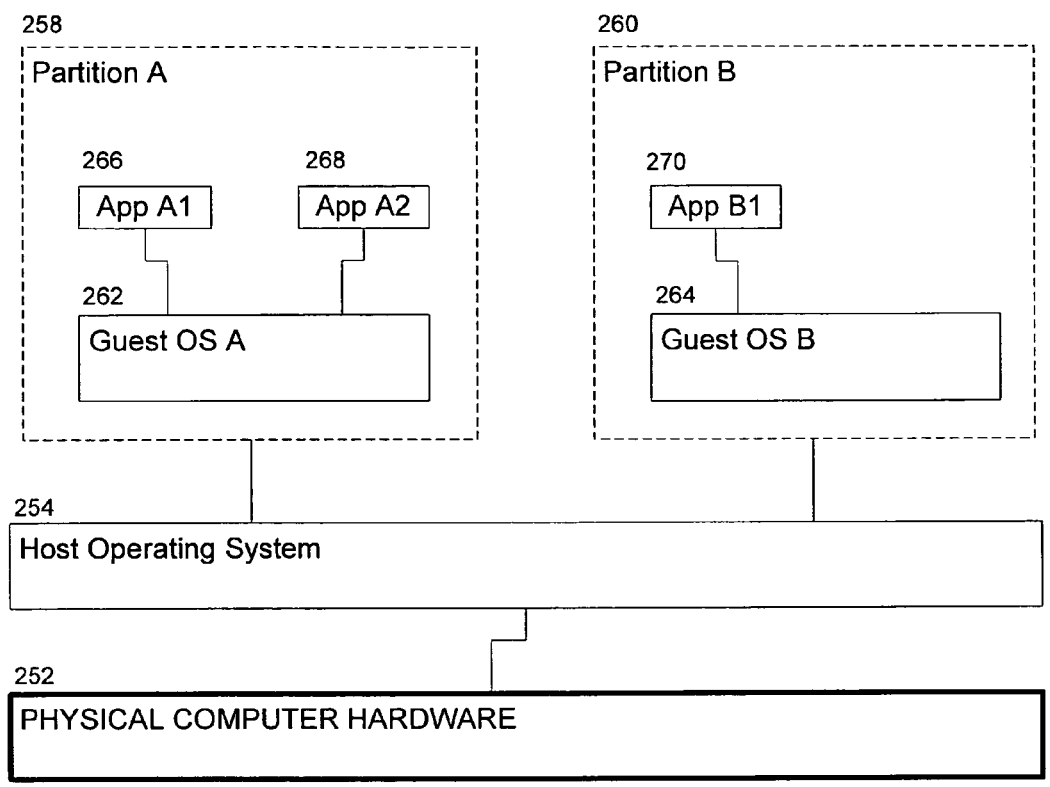
FIG. 3A is a block diagram representing a virtualized computing system wherein the virtualization is performed by the host operating system (either directly or via a hypervisor)

FIG. 3A illustrates a virtualized computing system comprising a host operating system (host OS) software layer 254 running directly above physical computer hardware 252, where the host OS 254 provides access to the resources of the physical computer hardware 252 by exposing interfaces to partitions A 258 and B 260 for the use by operating systems 262 and 264, respectively. This enables the host OS 254 to go unnoticed by operating system layers 262 and 264 running above it. Again, to perform the virtualization, the host OS 254 may be a specially designed operating system with native virtualization capabilities or, alternately, it may be a standard operating system with an incorporated hypervisor component for performing the virtualization (not shown).

Referring again to FIG. 3A, above the host OS 254 there are two partitions, partition A 258, which may be, for example, a virtualized Intel 386 processor, and partition B 260, which may be, for example, a virtualized version of one of the Motorola 680X0 family of processors. Within each partition 258 and 260 are guest operating systems (guest OSs) A 262 and B 264, respectively. Running on top of guest OS A 262 are two applications, application A1 266 and application A2 268, and running on top of guest OS B 264 is application B1 270.

In regard to FIG. 3A, it is important to note that partition A 258 and partition B 264 (which are shown in dashed lines) are virtualized computer hardware representations that exist only as software constructs. They are made possible due to the execution of specialized virtualization software(s) that not only presents partition A 258 and partition B 260 to Guest OS A 262 and Guest OS B 264, respectively, but which also performs all of the software steps necessary for Guest OS A 262 and Guest OS B 264 to indirectly interact with the real physical computer hardware 252.

FIG. 3B illustrates an alternative virtualized computing system wherein the virtualization is performed by a virtual machine monitor (VMM) 254' running alongside the host operating system 254". In certain cases, the VMM 254' may be an application running above the host operating system 254" and interacting with the computer hardware 252 only through the host operating system 254". In other cases, as shown in FIG. 3B, the VMM 254' may instead comprise a partially independent software system that on some levels interacts indirectly with the computer hardware 252 via the host operating system 254" but on other levels the VMM 254' interacts directly with the computer hardware 252 (similar to the way the host operating system interacts directly with the computer hardware). And yet in other cases, the VMM 254' may comprise a fully independent software system that on all levels interacts directly with the computer hardware 252 (similar to the way the host operating system interacts directly with the computer hardware) without utilizing the host operating system 254" (although still interacting with the host operating system 254" in order to coordinate use of the computer hardware 252 and avoid conflicts and the like).

All of these variations for implementing the above mentioned partitions are just exemplary implementations, and nothing herein should be interpreted as limiting the invention to any particular virtualization aspect.

Tagged TLBs in the Presence of a Hypervisor

As mentioned, tagged TLBs are used in many hardware architectures to reduce the high cost of discarding the entire TLB when an address space change occurs, however, no existing techniques exist to extend such techniques to virtualized computing environments with a hypervisor component acting on behalf of one or more guests. In various non-limiting embodiments of the invention, the invention thus provides tagged TLB techniques for use in the presence of a hypervisor of a virtualized computing environment. In this regard, in accordance with one embodiment of the invention, to improve the performance of an address space swap, hardware associates each virtual address with a unique per address space identifier called an address space identifier or ASID. Each entry in the hardware TLB is thus tagged with the ASID of the address space for which the translation is intended.

Figures 4A, 4B:
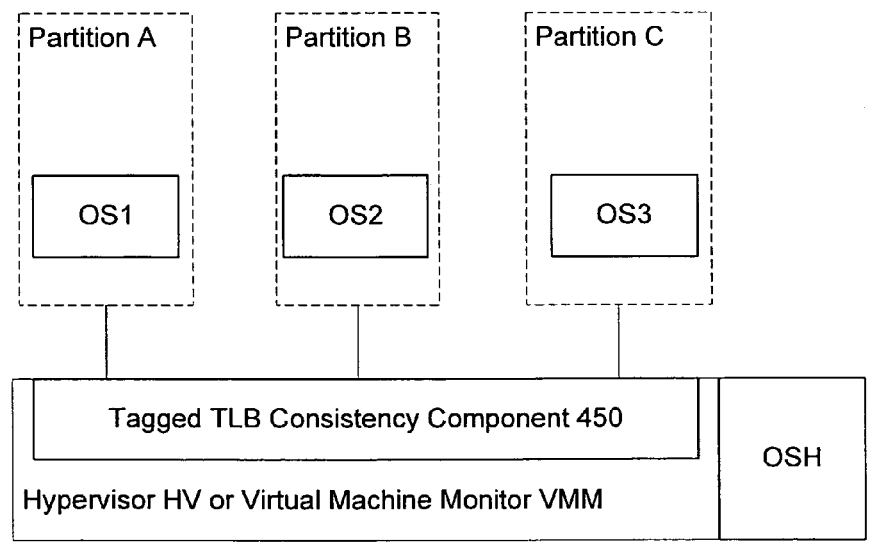
FIG. 4A illustrates an exemplary, non-limiting implementation of a tagged TLB in accordance with the invention.
FIG. 4B illustrates an exemplary, non-limiting block diagram of a hypervisor component of a virtualized computing environment implementing the tagged TLB techniques in accordance with the invention.

FIG. 4A illustrates a particular implementation of a tagged TLB, wherein an address space identifier (ASID) behaves as a tag by uniquely identifying a particular address space for a particular logical processor. In a tagged TLB, when the TLB is searched for a virtual to physical mapping, both the virtual address and the ASID must be matched for a successful hit in the TLB. Thus, in accordance with the invention, in the presence of a tagged TLB, the ASID uniquely identifies a particular address space on a particular logical processor. Notably, guest operating system(s) are allowed control over what ASIDs are used for translating virtual to physical addresses, effectively allowing multiple different virtual to physical translations to be stored at one time.

In various non-limiting embodiments of the invention, ASIDs are integers in the range from 0 to some maximum number, MAX_ASID. MAX_ASID can be set so that there are fewer address spaces/processes than MAX_ASID. Traditional tagged TLB management algorithms operate within an operating system on direct behalf of the processor; the algorithm of the invention described in more detail below, in contrast, operates within a hypervisor, i.e., a component that provides a virtual environment for guest operating system(s). These concepts are generally illustrated in FIG. 4B.

In this regard, the invention implements tagged TLB consistency algorithms in connection with a virtualized environment. As illustrated in FIG. 4B, there are three partitions A, B and C with guest OSs OS1, OS2 and OS3, respectively, executing via virtual machine monitor VMM or hypervisor HV and host OS OSH. In accordance with the invention, a Tagged TLB Consistency Component 450 of the hypervisor HV or virtual machine monitor VMM handles the problem of TLB consistency according to the algorithms described in more detail below by interacting with the virtual memory operations of the operating systems OS1, OS2, OS3 of each of the guest partitions A, B, C, respectively.

Algorithm Overview

Figure 5A:
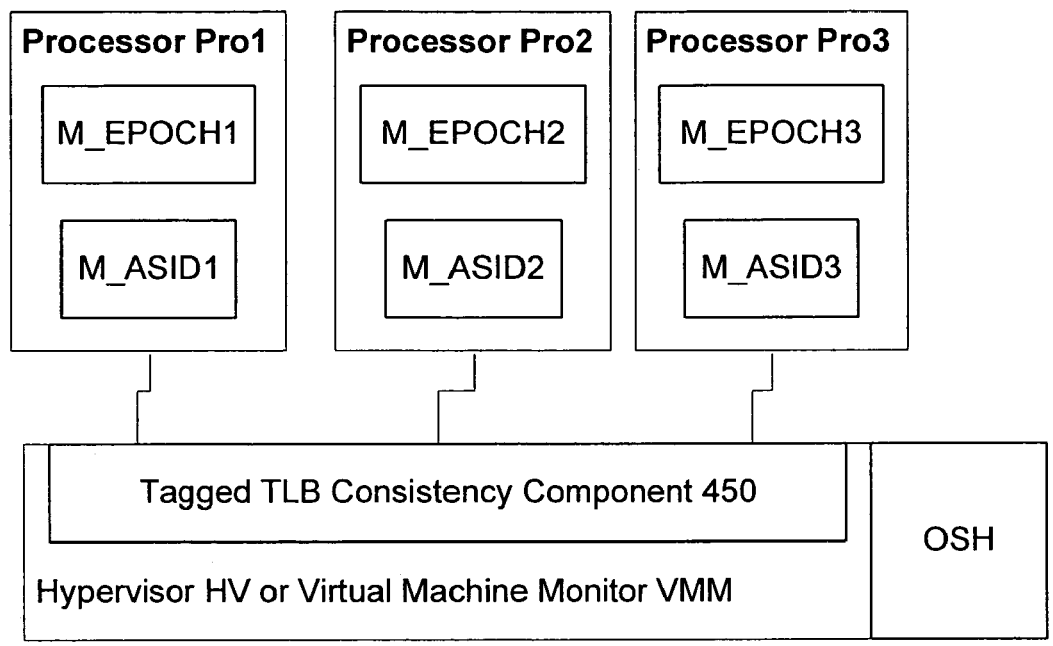
FIG. 5A illustrates an exemplary, non-limiting block diagram of a plurality of logical processors operating in a virtualized computing environment that implements the tagged TLB techniques in accordance with the invention.

In accordance with exemplary non-limiting embodiments of the invention, each logical processor of a virtualized computing environment maintains two counters, a master epoch counter and a master ASID counter. As illustrated in FIG. 5A, each logical processor Pro1, Pro2, Pro3, etc. of the virtualized computing environment includes a counter for counting the master epoch value M_Epoch1, M_Epoch2, M_Epoch3, etc. and a counter for counting the master ASID value $M\_ASID_1$, $M\_ASID2$, $M\_ASID3$, etc., respectively.

The master epoch values for M_Epoch1, M_Epoch2, M_Epoch3, etc. range from one to 'infinity' and define what epoch the current ASID counter is within; if the epoch for an address space does not match the current epoch, then the ASID associated with the address space is no longer valid and a new ASID must be generated. In one embodiment, $2^{64}$ is used as a proxy for an infinity value; in such a case, even if the ASID counter overflows a million times per second, it will be over 200,000 centuries before the epoch counter overflows.

The master ASID values for M_ASID1, M_ASID2, M_ASID3, etc. range between 1 and the maximum number of ASIDs that are valid for the hardware (MAX_ASID). The sentinel value of 0 for the epoch counter is reserved to signal that the ASID for this address space is invalid and the sentinel value of 0 for the ASID counter for use by the hypervisor. Current architectures do not allow the hypervisor to use ASIDs for its own address space. Accordingly, in one aspect, the algorithms of the invention can be modified for such a scenario, e.g., to enable the hypervisor to use ASIDs for its own address space, or otherwise provide a separate mapping.

Figure 5B:
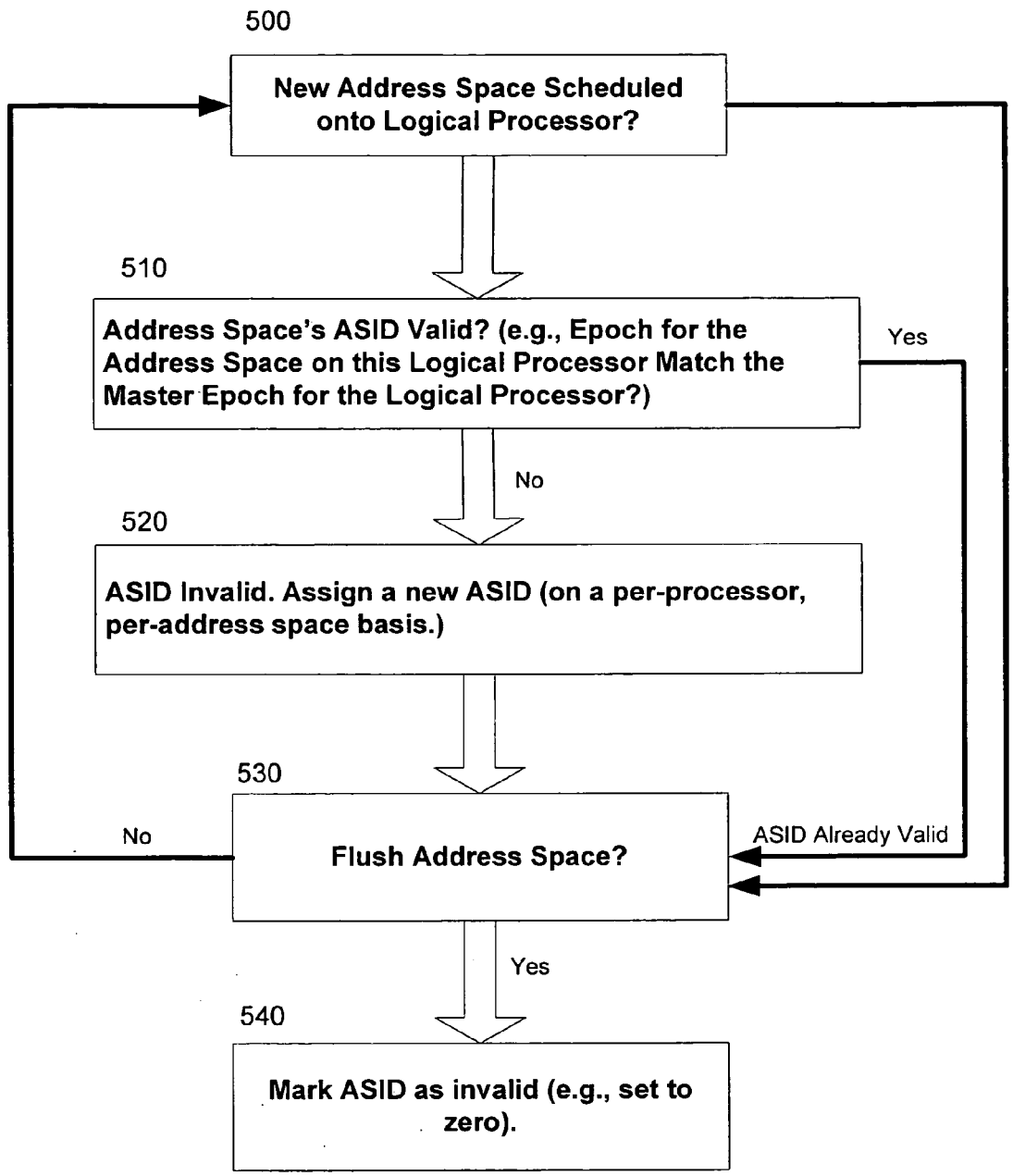
FIG. 5B illustrates an exemplary, non-limiting flow diagram of a process for performing maintenance of tagged TLB consistency for a virtualized computing environment according to exemplary algorithms of the present invention.

As illustrated in the exemplary, non-limiting flow diagram of FIG. 5B, a process is shown maintaining tagged TLB consistency data for a virtualized computing environment according to exemplary algorithms of the present invention. At 500, when an address space is scheduled onto a given logical processor, the address space is assigned an ASID if it does not already have a valid one. ASIDs are assigned on a per-processor, per-address space basis. For example, each address space will have different ASIDs (and epochs) for the different logical processors upon which it is scheduled. This allows the ASIDs to overflow independently on different logical processors, hence preventing any one processor's ASID overflow from requiring all other processors to flush. Furthermore, using separate ASIDs for separate logical processors allows unsynchronized updates to be performed on its ASID and Epoch counters, though it is recognized that each address space thus maintains an ASID and epoch for each logical processor upon which it the address space is utilized.

As stated above, when an address space is scheduled onto a given logical processor at 500, the address space is assigned a new ASID if it does not already have a valid one for this logical processor. Checking if the address space's ASID is valid for this logical processor is achieved at 510 and may be implemented as follows: if the epoch for the address space on this logical processor matches the master epoch for the logical processor, then the current ASID is valid; otherwise the current address space is invalid, and a new ASID is generated for this address space on this logical processor at 520. If the ASID is valid, step 520 is skipped. Thus, whenever an address space's epoch is out of synch with the master epoch for a given logical processor, a new ASID is generated prior to scheduling the address space again.

In accordance with the invention, to flush an address space, e.g., as illustrated at 530 of FIG. 5B (though shown as one diagram assigning ASIDs and flushing ASIDs may be implemented as separate processes), the ASID is marked as no longer valid at 540, e.g., by setting the epoch to zero for the logical processor and forcing any processors that are currently executing with this ASID to regenerate their ASIDs. It is noted that this implies tracking which logical processors are currently executing with a given ASID, which may be termed the 'active processors.'

Another complexity with flushing an entire address space is handling ASID overflow. If an infinite number of ASIDs is possessed, overflow would be unnecessary, and whenever an address space flush occurred, a new ASID could be generated. In practice, however, the number of ASIDs tends to be bounded by a relatively small number, so overflow handling should be performed in such case.

Thus, in one embodiment, flushing individual entries within an ASID, i.e., flushing individual virtual addresses within an address space, is performed by maintaining another set of processors in addition to the active set: the set of logical processors that may contain stale virtual to physical translations, which may be termed the 'stale processors' set. In accordance with the invention, a logical processor becomes stale when it is scheduled (at the same time as it becomes active); it is removed from the stale processors set after the TLB has been flushed for this logical processor, thus ensuring that no further stale virtual to physical translations exist (for any given ASID). Removal of a processor from the stale set may be done in a lazy fashion to avoid iterating over all address spaces for a logical processor.

Also, as mentioned, the algorithms of the invention rely upon two atomic instructions, i.e., interlocked-or and interlocked-and, which avoid the expense of spinlocks in prior art algorithms.

The exemplary, non-limiting algorithms of the invention described below maintain both per-processor and per-address-space data. The different data maintained are described in the following sections.

Per Processor Data

As described above, each logical processor maintains two counters, a master epoch counter and a master ASID counter, to store MasterEpoch and MasterAsid data, respectively.

In one embodiment, MasterEpoch data includes an integer value ranging from one to infinity, leaving zero as an invalid sentinel (in one embodiment, zero is used by the algorithm to denote "invalid" address space). The master epoch defines whether an ASID for a particular address space is valid or not. If the address space's epoch matches the master epoch for a particular logical processor, then the ASID associated with that processor is valid. Otherwise, the ASID is no longer valid and a new ASID is generated for this address space. The master epoch is accessed by the single processor for which the epoch is defined.

In one embodiment, MasterAsid data includes an integer value ranging from one to MAX_ASID; the zero ASID value is reserved for use by the hypervisor. The master ASID is also accessed by the single processor for which the ASID is defined.

Per Address Space Data

As mentioned, the logical processors currently executing with a given ASID are herein termed the 'active processors' and the set of logical processors that may contain stale virtual to physical translations are herein termed the 'stale processors.' Thus, each address space includes data representative of the ActiveProcessors and StaleProcessors. Each address space also includes data representative of epoch and Asid data.

The ActiveProcessors data supplies the set of logical processors which are currently executing with the particular address space. The ActiveProcessors set may be modified by any logical processors upon which the particular address space runs.

The StaleProcessors data supplies the set of logical processors that may be caching stale virtual to physical mappings for the particular address space. The ActiveProcessors set (above) is a subset of the StaleProcessors set. The stale processors set may be modified by any processors upon which the particular address space runs.

Also associated with each address space, on a per-logical-processor basis are the following two data items: Epoch data and Asid data.

Epoch data provides the current epoch within which a particular ASID is valid. If the epoch matches the master epoch, then the ASID field (described just below) is the correct ASID for this address space on the particular logical processor. Otherwise, the ASID is invalid, and a new ASID is generated. The epoch for an address space may be assigned to (a value of zero) by multiple logical processors. A non-zero value is assigned when executing on the logical processor for which the epoch is defined.

Asid data provides the current ASID for the particular address space. The ASID is only modifiable by the logical processor for which the ASID is designed.

Exemplary Primitives

In an exemplary, non-limiting implementation of the algorithms of the invention, the existence of the following primitive routines is assumed.

SendIPI(Processor-Set, IPI-Routine, Barrier)

The SendIPI( ) routine sends an inter-processor interrupt to all processors in the specified processor set, executing the routine specified in the second parameter. The third parameter is passed to the IPI routine without interpretation.

WaitForBarrier(Barrier)

Wait (spin) for the barrier to become signaled.

ReleaseBarrier(Barrier)

Release a barrier.

DisableIPIs( )

Disable IPIs for the current processor; this allows the current processor to perform operations that may require modification of global data structures that may also be modified by an IPI routine.

EnableIPIs( )

Re-enables IPIs that had previously been disabled by a call to the DisableIPIs( ) routine.

FlushCurrentProcessor( )

Flush the TLB on the current logical processor.

FlushMultipleTlbAlternativeAsid(Asid, VaList)

Flush a list of virtual addresses on the local processor for a non-resident ASID.

Resume( )

Enters back to the guest on the current virtual processor.

Exemplary Non-Limiting Pseudo-Code for Routines

Herein, some exemplary non-limiting pseudo code for an exemplary non-limiting implementation of the algorithms of the invention is provided. However, one of ordinary skill in the art can appreciate that enormous variation exists for code even at the pseudo code level, and that therefore, none of the follow implementation specific details should be thought to constitute the invention. In this regard, the invention is intended to be considered in accordance with the scope and spirit defined in the claims and the context of the overall invention described herein, and not necessarily in accordance with any non-limiting implementation specific details.

For the following exemplary non-limiting pseudo-code, the following notation is used to specify operations and other operations are specified with typical set notation. In this regard, the keyword 'countof' is used to provide a count of elements in a set. The keyword 'atomic' is used to specify an action that happens atomically (such as an update to a set) where all other operations do not have other atomicity guarantees. The keyword 'self' provides the current logical processor number. Now will be described the following functions that may be used to accomplish the above-described methods of the invention to achieve TLB consistency in the presence of a hypervisor in an exemplary, non-limiting implementation: FlushAddressSpace( ), FlushAddressSpaceIpiRoutine( ), FlushMultiple( ), FlushMultipleIpiRoutine( ), EnterHypervisor( ), ExitHypervisor( ) and TlbFlushed( ).

FlushAddressSpace( )

In an exemplary embodiment, the FlushAddressSpace( ) routine invalidates all cached virtual addresses to physical translations from the TLBs of all logical processors which may be caching such translations for the given address space. Upon entry to this routine, there may be stale virtual to physical translations cached on one or more logical processors for this address space; the logical processors may or may not be currently executing on this address space. When the routine exits, any virtual to physical translations that were cached on logical processors and marked as either stale or active upon entry to this routine are invalidated. It is noted the logical processors may become either stale or active while this routine is executing, but these address spaces are not guaranteed to be correctly invalidated.

To invalidate the address space, the following exemplary algorithm may be performed, followed by exemplary non-limiting pseudo code for performing the algorithm:

Step 1: Invalidate the ASID for this address spaces on all processors which may have stale entries (this includes both processors that are executing on this address space and those that are not).

Step 2: Interrupt all active processors to ensure the ASID switch takes effect immediately.

Step 3: Wait until all processors have completed step 2.

| EXEMPLARY NON-LIMITING PSEUDO-CODE |
| --- |
| for each Processor in AS→StaleProcessors do<br>  AS→Epoch[Processor] ← 0<br>ActiveProcessors ← AS→ActiveProcessors / {self}<br>Barrier ← countof ActiveProcessors<br>SendIPI(ActiveProcessors, FlushAddressSpaceIpiRoutine, Barrier)<br>WaitForBarrier(Barrier) |

FlushAddressSpaceIpiRoutine( )

In an exemplary embodiment, the FlushAddressSpaceIpiRoutine( ) routine is the IPI handler for the flush address space routine.

Upon entry, the current logical processor may contain stale virtual to physical translations.

When the routine exits, we have setup the virtual processor upon reentering the guest, any stale virtual to physical entries for the current address space will have been invalidated.

For IPI handling, the following exemplary algorithm may be performed, followed by exemplary non-limiting pseudo code for performing the algorithm:

Since we always check whether an ASID is valid prior to entering back into a guest, this routine releases the barrier (step 1) and allows the exit-hypervisor code do its work (step 2).

| EXEMPLARY NON-LIMITING PSEUDO-CODE |
| --- |
| ReleaseBarrier(Barrier) |

FlushMultiple( )

In an exemplary embodiment, the FlushMultiple( ) routine invalidates a list of virtual addresses from the TLBs of all logical processors which may be caching virtual to physical translations for the specified address space.

Upon entry to this routine, the list of virtual addresses provided to this routine may represent stale virtual to physical translations cached on one or more logical processors which may or may not be executing upon the current address space.

When we exit, any stale virtual to physical translations that were in the list of virtual addresses provided to this routine that were cached on logical processors which were marked as stale at the entry to this routine will be invalidated.

Logical processors may become stale or active while this routine is executing; these processors will not participate in the flush.

To flush the virtual addresses from the specified processors, the following exemplary algorithm may be performed, followed by exemplary non-limiting pseudo code for performing the algorithm:

Step 1: Interrupt all processors which may contain any stale virtual to physical translations.

Step 2: On each stale processor, perform a flush-different-ASID of the specified virtual addresses.

EXEMPLARY NON-LIMITING PSEUDO-CODE

```
StaleProcessors ← AS→StaleProcessors / {self}
Barrier ← countof StaleProcessors
SendIPI(StaleProcessors, FlushMultipleIpiRoutine, Barrier)
WaitForBarrier(Barrier)
```

FlushMultipleIpiRoutine( )

The FlushMultipleIpiRoutine( ) routine handles IPI for the flush multiple routine. Upon entry to the routine, the current processor may contain stale cached virtual to physical translations for the virtual addresses provided in the parameters. Upon exit, any virtual to physical translations that were cached on the current logical processor are thus invalidated upon reentering the guest. Furthermore, if the logical processor no longer contains cached stale TLB entries for this address space, it is removed as a processor the stale set. By removing the current processor from the stale set, the number of processors that need to be flushed during the next FlushMultiple( ) call are reduced.

Exemplary steps for performing the FlushMultipleIpiRoutine( ) are as follows:

Step 1: If the logical processor is no longer caching stale virtual to physical translations for this address space, remove it from the stale processors set and continue. It is detected whether the processor is no longer caching stale virtual to physical translations for the address space by comparing the epoch for the address space, logical processor tuple against the master epoch for the logical processor. If they are not the same, the address space acquires a new ASID prior to being scheduled on the logical processor; hence any cached, stale entries are no longer valid.

Step 2: If the logical processor is still caching stale virtual to physical translations for this address space, the list of virtual addresses supplied to us by the routine is explicitly flushed.

Step 3: Release the barrier, unblocking the logical processor that initiated the flush. The routine performs a flush of the specified virtual addresses with a different ASID, then releases the barrier upon which the initiating processor is waiting.

EXEMPLARY NON-LIMITING PSEUDO-CODE

```
if AS→Epoch[self] ≠ MasterEpoch[self] then
    atomic AS→StaleProcessors ← AS→StaleProcessors / {self}
else
    FlushRemoteList(AS→Asid[self], VaList)
    ReleaseBarrier(Barrier)
```

EnterHypervisor( )

The EnterHypervisor( ) routine is invoked when the hypervisor (exit the guest) is entered. The purpose of the routine is to update the active processors set used to track on each address space which processors are currently actively executing in the guest. Upon entry, the active processor set for this address space includes the current logical processor. When the routine exits, the current logical processor is removed from the active processors set.

EXEMPLARY NON-LIMITING PSEUDO-CODE

```
atomic AS→ActiveProcessors → AS→ActiveProcessors / {self}
```

ExitHypervisor( )

For the ExitHypervisor( ) routine, upon entry, the ASID for the logical processor on the address space to which context is about to switch may be invalid. Thus, in an exemplary implementation, when the guest is entered, the new address space will be executing on the current logical processor (identified as self below) with a valid ASID.

Exemplary steps for performing the ExitHypervisor( ) routine are as follows:

Step 1: Disable IPIs. IPIs are disabled for the duration of the routine because an IPI would re-enter this routine (upon exit).

Step 2: Add the current logical processor into the stale and active sets.

Step 3: Check if this address space contains a valid ASID (by checking if the Epoch matches the master Epoch). If the ASID is invalid, allocate a new ASID, handling overflow. In the case of overflow, the TLB for the current processor is flushed and the master epoch is updated. (This implementation assumes that it is practically impossible for the master Epoch to overflow; the algorithm will fail if the master Epoch overflows. Alternate implementations may handle Epoch overflow as a cautionary measure where applicable).

Step 4: Assign a new ASID and Epoch from the master ASID and Epoch. (Unless there was overflow, the new epoch will match the old epoch, so the assignment of the new Epoch is a no-op.)

Step 5: Re-enable IPIs, flush the TLB on the processor (if necessary), and resume to the guest.

EXEMPLARY NON-LIMITING PSEUDO-CODE

```
DisableIPIs( )
atomic AS→StaleProcessors ← AS→StaleProcessors ∪ {self}
atomic AS→ActiveProcessors ← AS→ActiveProcessors ∪ {self}
if AS→Epoch[self] ≠ MasterEpoch[self] then
```

-continued

EXEMPLARY NON-LIMITING PSEUDO-CODE

```
    MasterAsid[self] ← MasterAsid[self] + 1
    if MasterAsid[self] = MAX_ASID then
        MasterEpoch[self] ← MasterEpoch[self] + 1
        MasterAsid[self] ← 1
        FlushSelf ← true
    AS→Asid[self] ← MasterAsid[self]
    AS→Epoch[self] ← MasterEpoch[self]
    EnableIPIs( )
    if FlushSelf then
        FlushCurrentProcessor( )
    Resume( )
```

TlbFlushed( )

The TlbFlushed( ) routine is invoked when the TLB for a processor is flushed outside of Exit-Hypervisor routine discussed above. This can be either due to an implicit flush of the TLB for this processor, or from an explicit flush of the TLB for reasons other than invalidations to the guest address spaces. Upon entry to this routine, in an exemplary embodiment, the TLB the current processor contains no entries for any guest. When the routine exits, the MasterEpoch and MasterAsid values for this processor are modified to reflect that the TLB has been flushed.

Exemplary steps for performing the TlbFlushed( ) routine are as follows:

Step 1: When the TLB is flushed on a processor for any reason, the MasterEpoch for the processor is incremented and the MasterAsid is set to 1.

Step 2: Step 1 causes new ASIDs to be generated for each address space which is scheduled on the processor after the flush, which prolongs the time until ASID overflow occurs and prolongs any need to flush the TLB on this processor.

This routine should be invoked in a manner such that IPIs cannot interrupt the routine; ideally, this routine would be invoked at IPI level, to prevent the MasterEpoch and MasterAsid from being modified while this routine is executing.

EXEMPLARY NON-LIMITING PSEUDO-CODE

```
    MasterEpoch[self] ← MasterEpoch[self] + 1
    MasterAsid[self] ← 1
```

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with maintaining TLB consistency in a virtualized environment in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the techniques for maintaining TLB consistency in a virtualized environment in accordance with the invention.

Figure 6A:
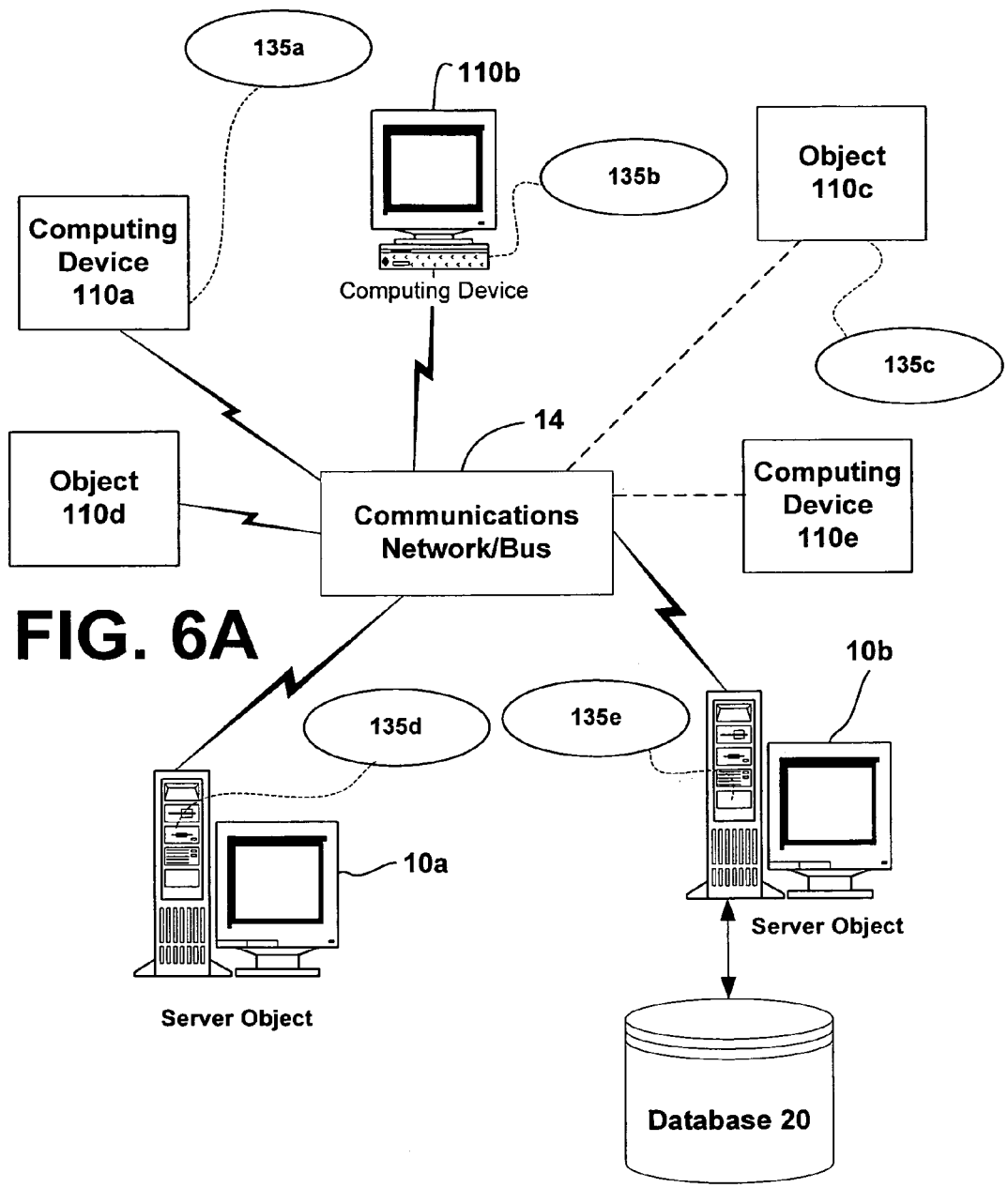
FIG. 6A is a block diagram representing an exemplary network environment in which the present invention may be implemented.

FIG. 6A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 6A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, that may implicate the algorithms for maintaining TLB consistency techniques in a virtualized environment in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to storage of data or execution of algorithms for maintaining TLB consistency techniques in a virtualized environment in accordance with the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, computing devices share data according to a variety of techniques, such as data accessed pursuant to maintaining TLB consistency in the presence of a hypervisor in accordance with the invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 6A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may implicate the techniques for maintaining TLB consistency in the presence of a hypervisor in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for maintaining TLB consistency of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 6A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like that may be used in accordance with algorithms of the present invention. It is thus contemplated that the present invention may apply to any computing device in a virtualized computing environment in which virtual memory techniques are employed to map virtual address space to physical address space.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 6B:
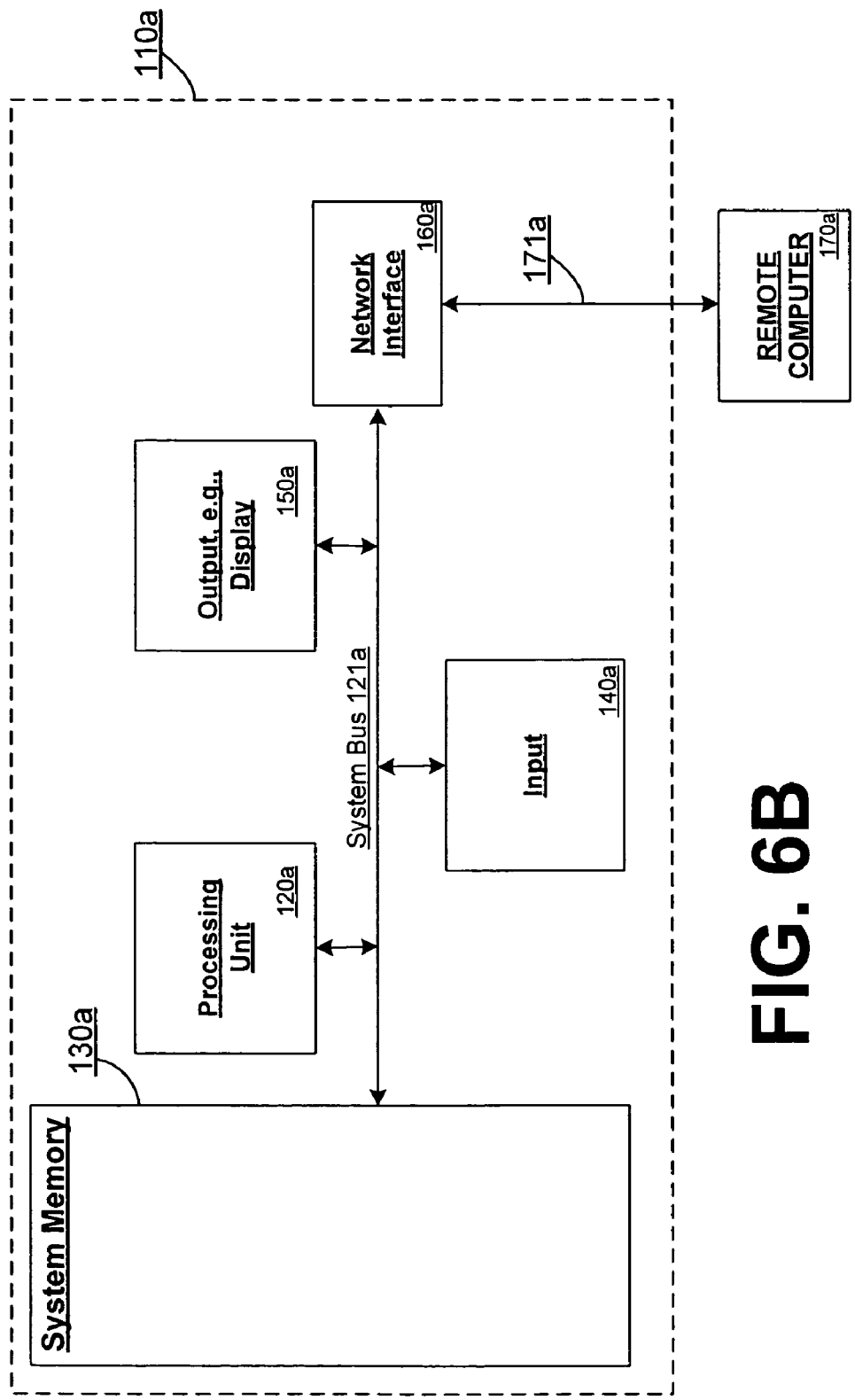
FIG. 6B is a block diagram representing an exemplary non-limiting computing system environment in which the present invention may be implemented.

As mentioned, the invention applies to any device wherein it may be desirable to maintain TLB consistency for one or more virtual machines in a virtualized environment. It should be understood, therefore, that handheld, portable and other computing devices and computing objects of all kinds are contemplated for use in connection with the present invention, i.e., anywhere that a device may execute in a virtualized environment with a hypervisor component or virtual machine monitor. Accordingly, the below general purpose remote computer described below in FIG. 6B is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 6B thus illustrates an example of a suitable computing system environment 100a in which the invention may be implemented, although as made clear above, the computing system environment 100a is only one example of a suitable computing environment for a media device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 6B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

A user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 6B include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein and associated communications are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for maintaining TLB consistency in a virtualized environment in accordance with the invention may be included in, supported in or accessed via all of the languages and services enabled by managed code, such as .NET code, and in other distributed computing frameworks as well. Also, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to maintain TLB consistency in a virtualized environment. For instance, the algorithm(s) and hardware implementations of a hypervisor object of the invention may be applied to the operating system of a computing device, provided as a separate object on the device, as part of another object, as a downloadable object from a server, as a "middle man" between a device or object and a network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the maintenance of TLB consistency in a virtualized environment of the present invention, e.g., through the use of a data processing API, or the like, are preferably implemented in a high level procedural or object oriented programming language to communicate with a computer system. However, the program(s) can be implemented in assembly or machine language, if desired. In any case, the language may be a partially or wholly compiled, or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network—anywhere where a virtualized computing environment may be found. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for implementing within a computer processor tagged translation lookaside buffer ("tagged TLBs") consistency across a virtualized computing environment:
    virtualizing a plurality of processes of a plurality of logical processors in the virtualized computing environment via a virtual machine monitor or hypervisor component for virtualizing one or more guests including the plurality of logical processors;
    maintaining, for each address space within a plurality of different logical processors, an epoch and address space identifier (ASID) for each logical processor upon which a guest address space is utilized;
    maintaining, by the virtual machine monitor or hypervisor component updates to said epoch and ASID values, tagged TLB data consistency associated with the plurality of processes on behalf of each of the plurality of logical processors that ensures the consistency of the tagged TLB data across all of the plurality of processes.

2. The method of claim 1, wherein when an address space is scheduled on a logical processor of the plurality of logical processors, further comprising determining whether a unique identifier associated with the address space is valid through the use of interlocked-or and interlocked-and atomic instructions.

3. The method of claim 2, wherein said determining includes determining whether an epoch for the address space for the logical processor matches the master epoch for the logical processor.

4. The method of claim 2, wherein if the unique identifier is determined to be invalid, assigning a new unique identifier to the address space and the logical processor shared by no other address space and logical processor pair.

5. The method of claim 2, wherein when an address space is scheduled to be flushed, further comprising invalidating a unique identifier associated with the address space.

6. The method of claim 5, wherein said invalidating includes marking a unique identifier associated with the address space as invalid.

7. The method of claim 6, wherein said marking includes setting the unique identifier to zero.

8. The method of claim 1, wherein the tagged TLB data associated with the plurality of processes on behalf of each of the plurality of logical processors minimizes the number of shared variable accesses between the plurality of logical processors.

9. The method of claim 1, wherein the maintaining by the virtual machine monitor or hypervisor component includes maintaining a list of logical processors which are currently executing with a particular address space and a list of logical processors that may be caching stale virtual to physical mappings for the particular address space.

10. The method of claim 1, wherein the maintaining by the virtual machine monitor or hypervisor component includes delaying at least one operation to improve performance.

11. A computer readable storage medium comprising computer executable instructions for performing the method of claim 1.

12. A computing device comprising means for performing each of the steps of the method of claim 1.

13. A computer processor device implementing tagged translation lookaside buffers ("tagged TLBs") via a virtual machine monitor or hypervisor component for virtualizing one or more guests, comprising:
    a host operating system including a virtual machine monitor or hypervisor component for virtualizing one or more guests including a plurality of logical processors for executing a plurality of processes via the virtual machine monitor or hypervisor component of the host operating system;
    the virtual machine monitor or hypervisor component maintains, for each address space within a plurality of different logical processors, an epoch and address space identifier (ASID) for each logical processor upon which a guest address space is utilized;
    wherein the virtual machine monitor or hypervisor component updates to said epoch and ASID values maintains tagged TLB data consistency associated with the plurality of processes on behalf of each of the plurality of logical processors that ensures consistency of the tagged TLB data across all of the plurality of processes.

14. The computing device of claim 13, wherein when an address space is scheduled on a logical processor of the plurality of logical processors, the virtual machine monitor or hypervisor component determines whether a unique identifier associated with the address space is valid through the use of interlocked-or and interlocked-and atomic instructions.

15. The computing device of claim 14, wherein if the unique identifier is determined to be invalid, assigning a new unique identifier to the address space and the logical processor shared by no other address space and logical processor pair.

16. The computing device of claim 14, wherein when an address space is to be flushed, the virtual machine monitor or hypervisor component invalidates a unique identifier associated with the address space.

17. The computing device of claim 13, wherein each of the logical processors maintains a master epoch value and a master address space identifier (ASID) value upon which the tagged TLB data is based.

18. The computing device of claim 17, wherein the master epoch value defines a current epoch for the logical processor so that the virtual machine monitor or hypervisor component can determine whether the address space is no longer valid and a new ASID is to be generated.

19. The computing device of claim 17, wherein the master ASID value ranges between one and the maximum number of ASIDs that are valid for underlying hardware of the logical processor.

20. A hypervisor component of an operating system implemented within a computer processor comprising one or more computer readable media comprising computer executable instructions for implementing tagged translation lookaside buffering for virtual to physical mappings for a plurality of guests having a plurality of logical processors executing a plurality of processes in a virtualized computing environment, comprising:
    a first software component that virtualizes the plurality of processes of the plurality of logical processors in the virtualized computing environment and maintains an epoch and ASID for each of said logical processors;
    a second software component that updates said epoch and ASID values and maintains tagged translation lookaside buffer data associated with the plurality of processes on behalf of each of the plurality of logical processors that ensures consistency of the tagged TLB data across all of the plurality of processes performed by the plurality of logical processors of the plurality of guests.

* * * * *